No. 892,512. PATENTED JULY 7, 1908.
G. W. FLEWELL.
GRAIN SEPARATOR.
APPLICATION FILED JAN. 18, 1907.
3 SHEETS—SHEET 2.
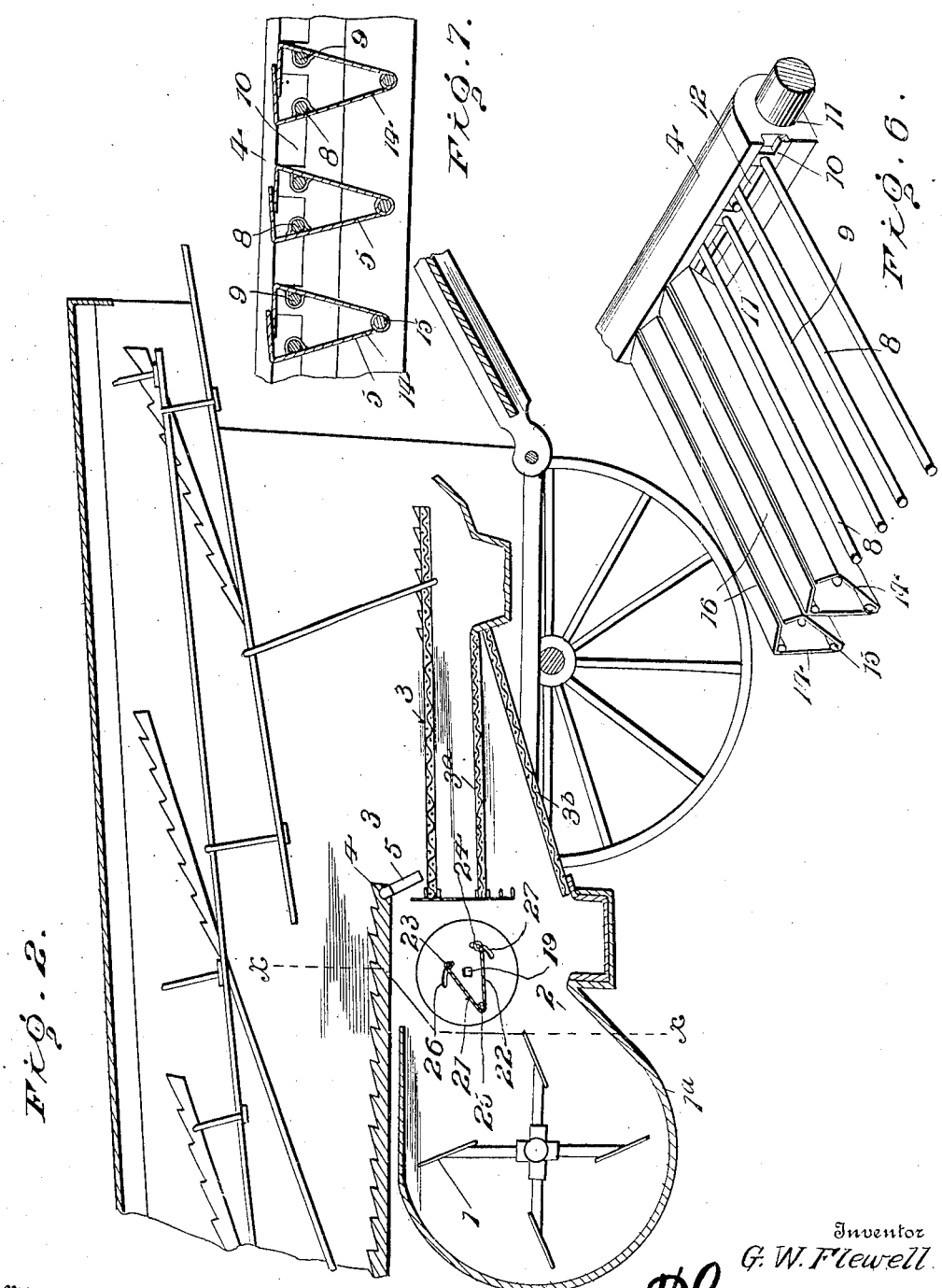
Witnesses
Inventor
G. W. Flewell
By Lacey,
Attorneys No. 892,512. PATENTED JULY 7, 1908.
G. W. FLEWELL.
GRAIN SEPARATOR.
APPLICATION FILED JAN. 18, 1907.
3 SHEETS—SHEET 3.
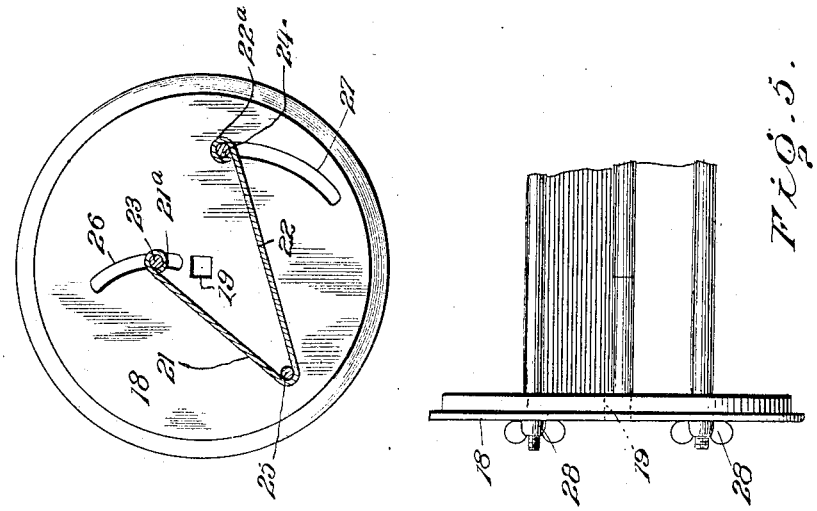

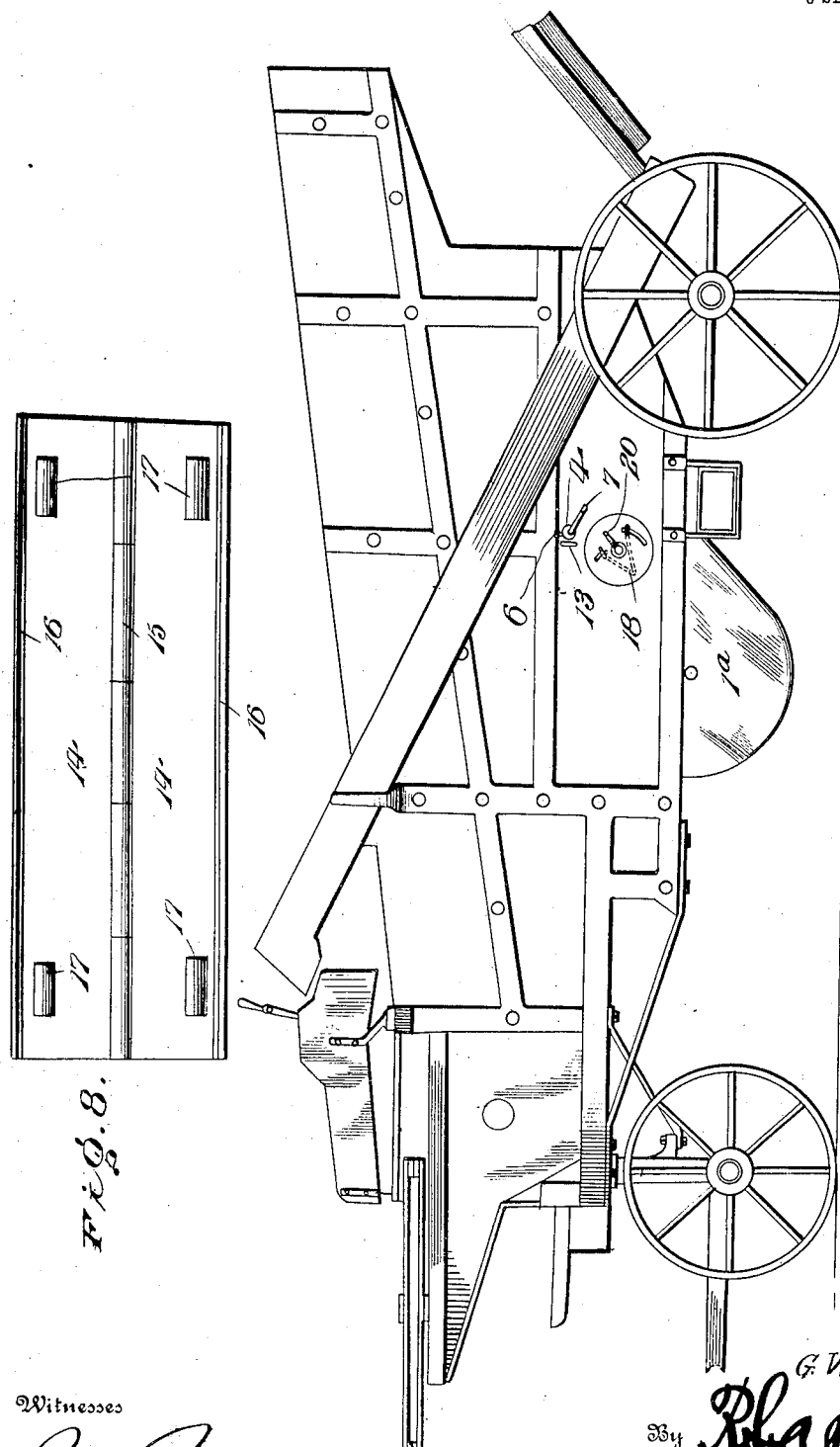

UNITED STATES PATENT OFFICE.

GEORGE W. FLEWELL, OF GRANDIN, NORTH DAKOTA.

GRAIN-SEPARATOR.

No. 892,512.    Specification of Letters Patent.    Patented July 7, 1908.

Application filed January 18, 1907. Serial No. 352,983.

*To all whom it may concern:*

Be it known that I, GEORGE W. FLEWELL, citizen of the United States, residing at Grandin, in the county of Cass and State of North Dakota, have invented certain new and useful Improvements in Grain-Separators, of which the following is a specification.

This invention contemplates certain new and useful improvements in grain separating mechanisms or attachments for threshing machines, and has particular relation to certain mechanisms for insuring that the chaff will be thoroughly separated from the grain at the rear end of the machine by effective currents of air that may be readily controlled or regulated, and the invention has for its object simple and efficient attachments of this character for threshing machines which will be hereinafter fully described and particularly pointed out in the appended claims.

For a full understanding of the invention and the merits thereof and also to acquire a knowledge of the details of construction of the means for effecting the result, reference is to be had to the following description and accompanying drawings, in which:

Figure 1 is a side elevation of a threshing machine with my improved attachment applied; Fig. 2 is an enlarged longitudinal sectional view of the rear end of the machine; Fig. 3 is a transverse sectional view, the section being taken approximately on the line x—x of Fig. 2; Fig. 4 is a detail side elevation of one of the heads of one of the air blast mechanisms; Fig. 5 is a fragmentary detail view of the same; Fig. 6 is a detail perspective view on an enlarged scale of a portion of the mechanism that is located at one end of the pan and which is hereinafter specifically referred to; Fig. 7 is an end elevation of a portion of the devices illustrated in Fig. 6; and, Fig. 8 is a detail view illustrating one of the blast controlling fingers in its spread out condition.

Corresponding and like parts are referred to in the following description and indicated in all the views of the drawings by the same reference characters.

Referring to the drawing, the numeral 1 designates the fan of a threshing machine mounted in its casing 1ª, the latter being provided with the usual blast channel 2.

3, 3ª, and 3ᵇ designate the sieves of the chaffer.

At the rear end of the grain pan I mount, in suitable boxings, a transversely extending shaft 4 which carries a plurality of draft forming fingers 5, the pan and the shoe of the thresher being separated a proper distance to accommodate and permit the effective operation of the said fingers. The shaft 4 is mounted to turn about its longitudinal axis so as to maintain the fingers 5 at different inclinations, and set screws 6 are provided to hold the shaft after it has been thus adjusted by means of a lever or handle 7, or similar device secured to it at one end.

In the specific construction of this portion of the mechanism, reference being had particularly to Figs. 6, 7 and 8, it will be seen that the shaft 4 is provided with two sets of rods 8 and 9, respectively. Extending parallel to each other as shown, the rods 8 are secured rigidly at one end to the shaft 4 while the rods 9 are secured at one end in a transversely movable slide 10 which is fitted to move within a groove 11 in the shaft. The said slide is formed with a series of slots 12 which accommodate the stationary rods 8 and which limit the back and forth sliding movement of the slide 10, and said slide is provided at one end with a handle 13 or similar device by which it may be moved in one direction or the other. The fingers 5 are composed of two sheet metal members 14 that are hinged along one edge, as indicated at 15 and they are provided at their opposite edges with angularly disposed flanges 16 adapted to overlap each other as shown best in Fig. 7. The two members 14 are formed at their ends with sleeves 17 by which they are adapted to be slid over the respective pairs of stationary and movable rods 8 and 9, as best seen in Fig. 6. By this means, it will be seen that the fingers 5 themselves may be expanded laterally or contracted by drawing the slide 10 in one direction or the other, and that the fingers as a whole may be tilted to different inclinations by turning the shaft 4 about its longitudinal axis. The fingers 5 extend manifestly parallel to each other and by spreading them out, to a greater or less degree, the spaces between them may be contracted as desired. As the fan 1 revolves, it is manifest that the air directed towards the inclined fingers 5 will be contracted into V-shaped blasts or drafts of greater or less sharpness, according as the slide 10 has been manipulated. In addition to and in correlation with this transversely extending series of laterally expansible fingers 5, I have provided what I have termed a "blast division mechanism", the same consisting of a pair of circular heads 18 that are flanged as illustrated in Fig. 5 and that are held to turn or revolve about their centers in the opposite sides of the casing. They are connected together by means of a central shaft 19 which is square as shown in Fig. 4 and which is provided at one end with a handle 20 by which the heads may simultaneously be turned. Extending from one head to the opposite are two plates 21 and 22, respectively, said plates being each provided with a curled edge 21ª and 22ª within which the adjusting rods 23 and 24 fit. These rods extend through curved slots 26 and 27 in the respective heads, and thumb nuts 28 are mounted upon the ends of the respective adjusting rods so as to clamp the two plates 21 and 22 at different inclinations. Both of these plates are hinged at one edge upon a rod 25 which is stationary with respect to the heads.

As best seen in Fig. 2, the apex of the angle which is formed by these two plates 21 and 22 points towards the blast fan 1 with the longer plate 22 lowermost, and it is obvious that the said plates may each be adjusted so as to form angles of different degrees between them, while both plates may be adjusted simultaneously by turning the heads 18. This mechanism is located midway of the blast channel 2 of the casing 1ª and is interposed between the fan and the series of fingers 5.

Before describing the practical operation of my improved grain separating mechanism and the advantages derived therefrom, I deem it expedient to set forth the difficulties that have arisen heretofore with mechanisms of this type, as I shall be able to better set forth in this manner the distinctive features of my invention.

By reason of the common use of spike pitchers pitching into the self-feeders, the grain coming off the grain pan in the shoe causes a flood by the chaff and grain on the shoe and disadvantageous results follow. In the first place, it becomes necessary to force enough wind on to separate the chaff from the grain, and in so doing, on account of the flooding, a considerable amount of threshed grain is blown in the return elevator and obviously a considerable amount also goes over into the blower. On the other hand, if an attempt is made to remedy the defect above mentioned by shutting off the blast or wind, it is evident that the chaff and grain will ride together over into the blower and consequently the work in the grain tank is flooded with chaff and dirt. In either event, under ordinary constructions now employed, the operator is between the two horns of a dilemma.

It will be seen, however, that with my attachments, which work together, and coact with one another by having the fingers 5 open to their widest extent, a smaller space for the wind to go through is provided and the wind in coming into a wider space and going out of a narrow space obviously makes a suction instead of a straight draft. As the chaff and grain which come from the pan onto my series of fingers meet the suction of currents of air, the chaff is sucked from the grain and both chaff and grain rise in a rainbow shaped current of air. As the chaff is lighter, it rises higher and obviously falls farther towards the rear of the chaffer, but before it touches the chaffer, the wind coming from the fan underneath the blast division mechanism catches the edge of the rainbow shape current of chaff and carries it to the blower, while the grain being heavier than the chaff falls more slowly, and in the shelter of the V-shaped division mechanism, on to the chaffer and thence goes through the chaffer down to the screw or conveyer of the grain tank elevator. Hence, it will be seen that most of the chaff is separated from the grain before they go to the chaffer and as the chaffer is at an increased slant, it is impossible for very much already-threshed grain to go to the return elevator to be cracked up by the cylinder. Consequently no grain goes over into the blower. Further, as the separation takes place at the series of fingers 5, the grain is not retarded by the chaff and it therefore does not matter how much the machine is flooded.

From the foregoing description in connection with the accompanying drawings, it will be seen that I have provided a very efficient separating mechanism which is very simple in construction and durable, and which is capable of regulation to meet the varying conditions that might arise.

Having thus described the invention, what is claimed as new is:

1. The combination with a grain separator of the character described, of a grain pan, a chaffer at the end of the pan, a fan and its casing with its air blast channel underneath the rear end of the pan, the blast channel being directed towards the chaffer, a blast dividing mechanism located within the mouth of said channel, a series of fingers extending from the grain pan to the chaffer and adapted to divide the blast into currents of air, and means for varying the inclination of said fingers.

2. The combination with a grain separator of the character described, of a grain pan, a chaffer at the rear end of the pan, a fan underneath the rear end of the pan and provided with a blast channel directed toward the chaffer, a series of spaced fingers extending longitudinally from the grain pan to the chaffer and adapted to divide the blast into currents of air, and means for expanding and contracting said fingers, as and for the purpose set forth.

3. In a grain separator of the character described, the combination of a grain pan, a chaffer at the rear end of said pan, a fan underneath the rear end of said pan and provided with a blast channel directed towards said chaffer, a series of fingers extending longitudinally from the rear end of the pan to said chaffer, and a blast mechanism located in the said channel and adapted to be adjusted so as to contract the channel to a greater or less extent and to direct more or less of the draft towards said fingers and underneath the same.

4. In a grain separator of the character described, the combination of a grain pan, a chaffer at the rear end of the pan, a blast fan underneath said pan, a series of spaced fingers located at the rear end of the pan, and extending towards the chaffer, said fingers being substantially V-shaped in cross section, and means for laterally expanding and contracting said fingers at their upper edges whereby to produce between said fingers contracted air spaces of inverted V-shape.

5. In a grain separator of the character described, the combination of a grain pan, a chaffer at the rear end of said pan, a blast fan underneath the rear end of the pan and provided with a blast channel directed towards said chaffer, a shaft extending transversely at the rear of the grain pan, means for adjusting said shaft about its longitudinal axis, rods projecting from said shaft, and fingers consisting of members provided with sleeves adapted to fit over said rods.

6. In a grain separator of the character described, the combination of a grain pan, a chaffer at the rear end of said grain pan, a blast fan underneath said grain pan and provided with a blast channel directed towards the chaffer, a shaft extending transversely at the rear end of the pan, a series of relatively stationary rods secured to said shaft, a slide mounted to move longitudinally of the shaft, a series of rods carried by said slide and forming a plurality of pairs of rods with the said stationary rods and fingers constructed of hinged members that are supported on the respective stationary and movable rods.

7. In a grain separator of the character described, the combination of a grain pan, a chaffer at the rear end of the grain pan, a blast fan underneath the said pan and provided with a blast channel directed towards the chaffer, a shaft extending transversely at the rear end of the grain pan, a series of relatively stationary rods secured to said shaft, a slide mounted to move transversely on the shaft and provided with a series of slots accommodating the stationary rods whereby to limit the movement of the slide, a series of rods secured to said slide, and fingers consisting of hinged members provided with angularly disposed flanges and with sleeves adapted to be slipped over the said rods.

In testimony whereof I affix my signature in presence of two witnesses.

GEORGE W. FLEWELL. [L. S.]

Witnesses:
BENJ. CAMERON,
A. S. DUNTLEY.